US006624875B2

United States Patent
Morita

(10) Patent No.: US 6,624,875 B2
(45) Date of Patent: Sep. 23, 2003

(54) IMAGE RECORDING DEVICE

(75) Inventor: Naoyuki Morita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/170,191

(22) Filed: Jun. 13, 2002

(65) Prior Publication Data

US 2002/0191162 A1 Dec. 19, 2002

(30) Foreign Application Priority Data

Jun. 15, 2001 (JP) ........................................ 2001-182479

(51) Int. Cl.⁷ ............................. G03B 27/32; G03B 3/08
(52) U.S. Cl. ........................... 355/27; 396/612; 396/624
(58) Field of Search ............................. 355/27; 396/564, 396/612, 613, 614, 617, 620, 622, 624

(56) References Cited

U.S. PATENT DOCUMENTS 6,048,111 A * 4/2000 Kurumisawa et al. ...... 396/622
6,208,410 B1 * 3/2001 Kuwabara .................. 355/405
6,287,024 B1 * 9/2001 Furukawa .................. 396/571

FOREIGN PATENT DOCUMENTS

| JP | 2664530 | 10/1990 |
| JP | 2664531 | 10/1990 |
| JP | 2001-142192 | 5/2001 |

* cited by examiner

Primary Examiner—Alan A. Mathews
(74) Attorney, Agent, or Firm—Sughrue Mion, PLLC

(57) ABSTRACT

An image recording device includes: a supplying section for supplying recording media; an image recording section for exposing, on the basis of digital image data, the recording media supplied from the supplying section, so as to record images on the recording media; a developing section for developing the recording media on which the images have been recorded; a drying section for drying the recording media which have been developed; and a sealing mechanism, provided between the image recording section and one of the developing section and the drying section, for preventing one of heat and vapor from one of the developing section and the drying section from entering the image recording section. The image recording section is disposed above or below the developing section.

16 Claims, 7 Drawing Sheets

IMAGE RECORDING DEVICE

BACKGROUND OF THE INVENTION

1. Field of the Invention

The present invention relates to an image recording device which exposes a recording medium on the basis of image data so as to record an image on the recording medium, and subjects the recording medium, on which the image has been recorded, to developing and to drying, and thereafter, discharges the recording medium as a print.

2. Description of the Related Art

Printer processors, which serve as image recording devices which form images on photographic printing papers on the basis of image data recorded on photographic films or the like and discharge the photographic printing papers as photographic prints, have been utilized conventionally.

In the printer of the printer processor, a film image recorded on a photographic film, for example, is exposed onto a photographic printing paper on the basis of image data read by dividing the film image into respective color components of R, G, B, such that an image is recorded onto the photographic printing paper. Next, in the processor of the printer processor, developing and fixing are carried out on the photographic printing paper on which the image has been recorded, and the photographic printing paper which has been wet by the developing and fixing is dried at a drying section, and then the photographic printing paper is discharged as a photographic print.

In such a printer processor, the printer and the processor are connected. The photographic printing paper, on which an image has been recorded in the printer, is subjected, as is, to developing in the processor, such that photographic prints can be produced efficiently.

However, because the printer and the processor are disposed adjacent to one another, the surface area required for placement of the printer processor is large. Accordingly, there has been the demand to reduce the space (surface area) occupied by the printer processor, in order to effectively utilize the limited space within a store when the printer processor is set within the store.

SUMMARY OF THE INVENTION

In view of the aforementioned, an object of the present invention is to provide an image recording device in which less surface area is required for placement of the image recording device.

An image recording device relating to a first aspect of the present invention comprises: a supplying section for supplying recording media; an image recording section for exposing, on the basis of digital image data, the recording media supplied from the supplying section, so as to record images on the recording media; a developing section for developing the recording media on which the images have been recorded; a drying section for drying the recording media that have been developed; and a sealing mechanism, provided between the image recording section and one of the developing section and the drying section, for preventing one of heat and vapor from one of the developing section and the drying section from entering the image recording section, wherein the image recording section is disposed above or below the developing section.

An image recording device relating to a second aspect of the present invention comprises: a supplying section for stocking and supplying sheet-shaped recording media; an image recording section for exposing, on the basis of digital image data, the recording media supplied from the supplying section, so as to record images on the recording media; a developing section for developing the recording media on which the images have been recorded; and a drying section for drying the recording media that have been developed, wherein the image recording section is disposed above or below the developing section.

An image recording device relating to a third aspect of the present invention comprises: a supplying section for supplying recording media; an image recording section for exposing, on the basis of digital image data, the recording media supplied from the supplying section, so as to record images on the recording media; a developing section for developing the recording media, on which the images have been recorded; a drying section for drying the recording media that have been developed; and a distributing section for distributing the recording media supplied from the supplying section into plural rows in a direction orthogonal to the recording media conveyance direction, wherein the image recording section is disposed above or below the developing section, and the distributing section is disposed between the supplying section and the image recording section or between the image recording section and the developing section.

In the image recording device relating to the present invention, at least an image recording section (printer), which exposes recording media and records images thereon, and a developing section (processor), which carries out developing (including developing, fixing and washing processes) on the recording media on which the images are formed, which were disposed so as to be lined up next to each other in the conventional art, are disposed one above the other. Thus, the surface area needed for placing the image recording apparatus can be reduced.

Further, in the image recording device of another embodiment further comprises a distributing section for distributing the recording media supplied from the supplying section into plural rows in a direction orthogonal to the recording media conveyance direction, wherein the distributing section is disposed between the supplying section and the image recording section or between the image recording section and the developing section.

Furthermore, in the image recording device of still another embodiment further comprises a consolidating section for consolidating the plural rows of the recording media, downstream from the drying section in the recording media conveyance direction, into a single row.

DESCRIPTION OF THE PREFERRED EMBODIMENTS

Hereinafter, the image recording device of the present invention will be described in detail with reference to the drawings.

Figure 1:
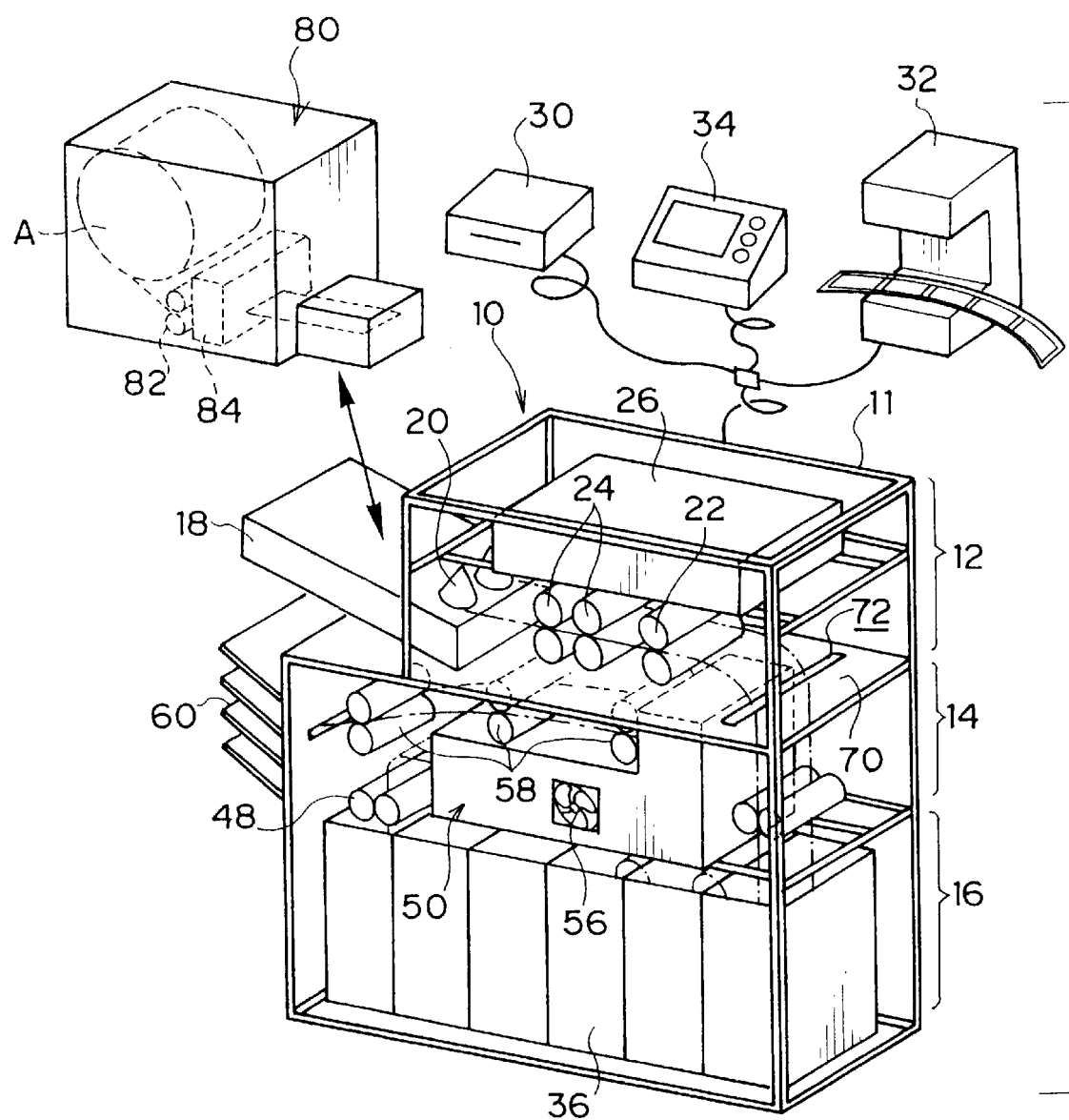
FIG. 1 is a schematic perspective view, for explanation, of an image recording device relating to a first embodiment of the present invention.

As shown in FIG. 1, an image recording device 10 is formed by arranging, in three levels along the vertical direction, an image recording unit 12, a drying unit 14, and a processor unit 16, all supported by a frame 11. Note that, in FIG. 1, outer panels mounted to the frame 11 have been removed for convenience of explanation.

The image recording unit 12 disposed at the uppermost level has suction pads 20, a first conveying roller pair 22, a pair of conveying roller pairs 24 for exposure, and an exposure device 26. The suction pads 20 are for removing one sheet-shaped photosensitive material (photographic printing paper) A from a sheet cassette 18 mounted to the side surface of the image recording unit 12, and for feeding the photosensitive material A out to a conveying path. The first conveying roller pair 22 is for conveying the photosensitive material A along the conveying path. The pair of conveying roller pairs 24 for exposure is for conveying the photosensitive material A accurately along the sub-scanning direction at an exposure position. The exposure device 26 subjects the photosensitive material A, which is being conveyed accurately in the sub-scanning direction by the conveying roller pairs 24 for exposure, to scanning-exposure in the main scanning direction which is orthogonal to the sub-scanning direction, so as to record an image on the photosensitive material A.

A control section (not shown) is provided within the image recording unit 12. The control section controls the driving of the conveying system (the suction pads 20, the conveying roller pair 22, the conveying roller pairs 24 for exposure, and the like) and the exposure device 26 on the basis of digital image data inputted from a media reader 30, a film scanner 32, or a customer-operated input device 34, each of which serves as an image data input device, such that an image is recorded on the photosensitive material A.

Here, although the media reader 30, the film scanner 32, and the customer-operated input device 34 have all been mentioned for explanation, it suffices to provide only one of these devices. The media reader 30 is a device which, for example, reads, from a floppy disk, digital image data photographed by a digital camera. Further, the film scanner 32 is a device which reads image data of a photographic film as digital image data via a CCD camera. The customer-operated input device 34 is a device which is disposed at a store. A customer, who desires prints, inserts a medium, on which digital image data is stored, into the customer-operated input device 34 and operates the device 34. In this way, the digital image data is read out from the medium, and the customer can input instructions for desired processes to the unillustrated control section of the image recording device 10.

The control section also carries out control for driving a processor 36 and a drying device 50 which will be described later.

Figure 2:
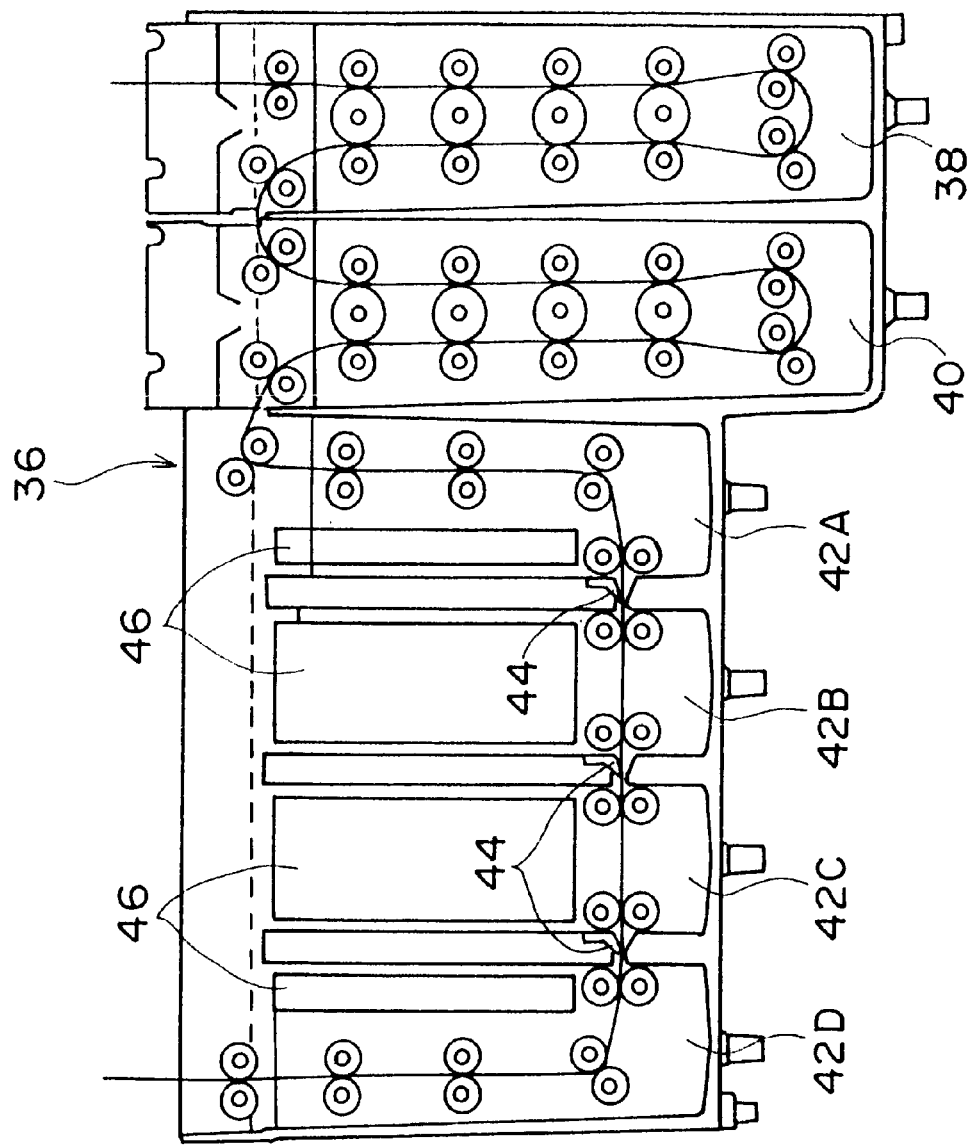
FIG. 2 is a side view of a processor relating to the first embodiment of the present invention.

The processor unit 16, which is disposed at the lowest level, is equipped with the processor 36 which carries out developing on the photosensitive material A on which an image has been recorded in the image recording unit 12 and which has reached the processor 36 via a conveying path provided within the drying unit 14 which is disposed at the middle level. As shown in FIG. 2, the processor 36 has a developing tank 38, a fixing tank 40, and washing tanks 42A through 42D which contain developing solution, fixing solution, and wash water, respectively. The photosensitive material A, which has entered into the processor 36, is subjected to developing and fixing processing and is washed by passing through the developing tank 38, the fixing tank 40, and the washing tanks 42A through 42D. The conveying path of the washing tanks 42A through 42D is connected at the lower portions of the respective washing tanks 42A through 42D, and is short. Blades 44 serving as sealing members are provided at the connected portions of the washing tanks 42A through 42D. By being opened only when the photosensitive material A is passing through and being closed at other times, the blade 44 suppresses the mixing together of the waters in the respective tanks.

Spacers 46 are inserted into the respective washing tanks 42A through 42D, in order to cut-down on the amount of water used in the washing tanks 42A through 42D.

The drying unit 14 which is disposed at the middle level includes squeeze rollers 48, which remove moisture from the photosensitive material A discharged from the processor 36, and the drying device 50.

Figure 3:
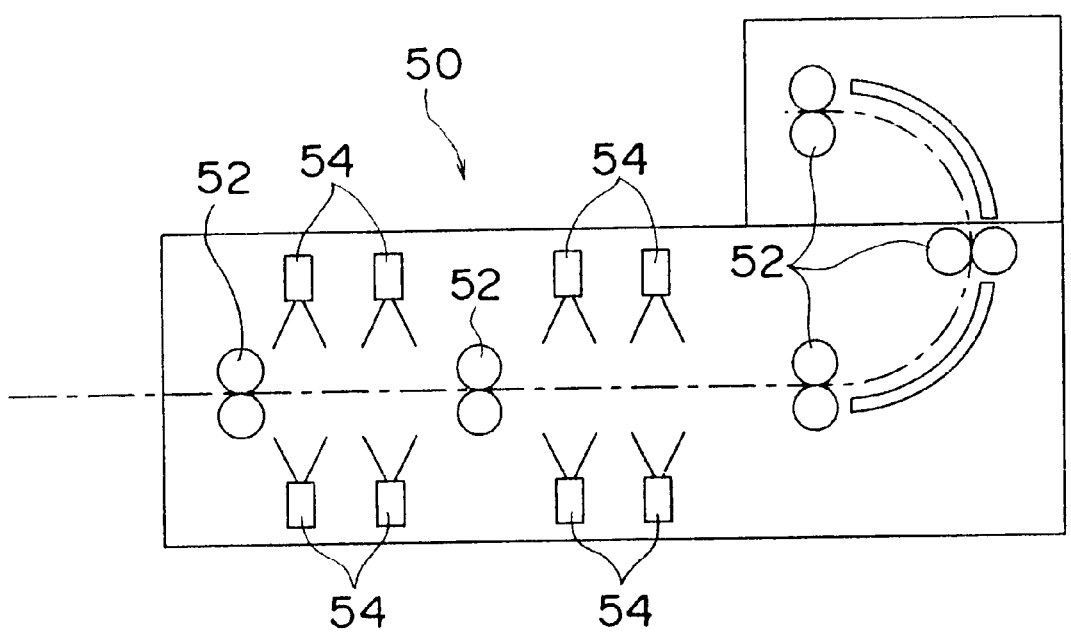
FIG. 3 is a side view of a drying device relating to the first embodiment of the present invention.

As shown in FIG. 3, the drying device 50 blows-out warm air from blow-out openings 54 toward both sides of the photosensitive material A which is being conveyed within the drying device 50 by second conveying roller pairs 52. Fans 56 for intake (see FIG. 1), which take-in air from the exterior, are provided at the side surfaces of the drying device 50.

The photosensitive material A, which is discharged from the upper portion of the drying device 50, is discharged to the exterior by third conveying roller pairs 58, and is stacked on a sorter 60 provided at the side wall of the image recording device 10.

The image recording unit 12 and the drying unit 14 are cut-off from one another by a wall 70. In this way, the heat and vapor generated at the drying unit 14 are prevented from moving into the image recording unit 12. This is in order to prevent the image recording of the photosensitive material A in the image recording unit 12 from being affected by the heat and vapor generated in the drying unit 14.

A slit 72 is formed in the wall 70 so that the photosensitive material A can move along the conveying path from the image recording unit 12 to the drying unit 14.

Next, the operation of the image recording device 10 having the above-described structure will be described simply, and the effects thereof will be explained.

In the image recording device 10, when image data is inputted to the control section from the media reader 30, the film scanner 32, or the customer-operated input device 34, the sheet-shaped photosensitive material A is removed from the sheet cassette 18 by the suction pads 20, and is inserted onto the conveying path. The photosensitive material A is conveyed accurately in the sub-scanning direction by the conveying rollers 24 for exposure. Due to the photosensitive material A being scan-exposed by the exposure device 26 in the main scanning direction which is orthogonal to the sub-scanning direction, an image based on the image data is recorded on the photosensitive material A. The photosensitive material A on which an image is recorded is passed through the slit 72 of the wall 70 by the first conveying rollers 22, and, from the image recording unit 12 and via the drying unit 14, reaches the processor 36 of the developing unit 16. At the processor 36, by passing successively through the developing tank 38, the fixing tank 40, and the washing tanks 42A through 42D, the photosensitive material A is subjected to developing, fixing, and washing. At this time, while moving between the washing tanks 42A through 42D, the photosensitive material A passes through by pushing the blades 44 open. After the photosensitive material A passes by a blade 44, the blade 44 closes the connected portion such that the waters in the respective tanks can be prevented from mixing together. Further, because the washing tanks 42A through 42D are interconnected to one another at the lower portions thereof, the length of the conveying path is short, and washing can be carried out efficiently, i.e., in a short time.

The photosensitive material A, which has been subjected to developing, fixing and washing in the processor 36, is inserted into the drying device 50 via the squeeze rollers 48. In the drying device 50, the photosensitive material A is dried by warm air being blown toward the both surfaces thereof from the blow-out openings 54 while the photosensitive material A is conveyed by the second conveying rollers 52. Accordingly, the photosensitive material A is dried quickly on a relatively short conveying path. The dried photosensitive material A is discharged to the sorter 60 by the third conveying rollers 58.

At this time, although heat and vapor are generated in the drying unit 14 (the drying device 50), the generated heat and vapor can be prevented from being transmitted to the image recording unit 12 because the image recording unit 12 and the drying unit 14 are cut-off from one another by the wall 70. Accordingly, the heat and vapor generated in the drying unit 14 can be prevented from affecting the image recording in the image recording unit 12.

In this way, in the image recording device 10 relating to the present embodiment, the image recording unit 12, the drying unit 14, and the developing unit 16 are disposed so as to be arranged (stacked) vertically. Thus, as compared with a conventional image recording device in which the image recording unit (printer) and the developing unit (processor) are arranged in a row, the space needed for placement of the device can be greatly reduced, and the device can be set in a small space within a store.

If the image recording unit 12 is disposed so as to be stacked above the drying unit 14 (the developing unit 16) in order to reduce the surface area which the image recording device 10 occupies, there is the concern that heat and water vapor from the drying unit 14 will be transferred to the image recording unit 12, and the state of recording an image on the photosensitive material A will deteriorate. However, because the transmission of heat and water vapor to the image recording unit 12 is suppressed by the wall 70, deterioration in image recording can be suppressed, and high-quality image recording can be carried out.

Moreover, in the image recording device 10, image recording is carried out on the basis of digital image data read at the media reader 30, the film scanner 32, the customer-operated input device 34, or the like. Thus, the structure can be simplified and the device can be made more compact as compared with a structure in which, for example, an image is recorded by developing a photographic film and exposing an image onto a photographic printing paper via the film at which the image has been made visible.

Further, because the sheet-shaped photosensitive material A (the sheet cassette 18) is used, the cassette can be made more compact as compared with a case in which a photosensitive material in roll form is used.

In the processor 36, the conveying path is connected at the lower portions of the washing tanks 42A through 42D. Thus, the conveying path can be made shorter and washing processing can be carried out efficiently, as compared with a case in which the conveying path is connected at the upper portions of the washing tanks 42A through 42D (refer to the developing tank 38 and the fixing tank 40). Further, because the blades 44 are provided at the connecting portions between the washing tanks 42A through 42D, the photosensitive material A can pass therethrough, and mixing-together of the waters in the respective tanks can be suppressed.

In the present embodiment, because the sheet-shaped photosensitive material A is used, the sheet cassette 18 and the suction pads 20 are used. However, as shown in FIG. 1, a photosensitive material magazine 80, from which the photosensitive material A in roll form is pulled-out by pull-out rollers 82, may be mounted. Note that a cutter 84 is provided at the photosensitive material A pull-out side of the photosensitive material magazine 80. The cutter 84 cuts the photosensitive material A which has been pulled-out, so as to form a sheet-shaped photosensitive material A of a desired length.

In the image recording device 10 of the present embodiment, the slit 72 is provided in the wall 70. However, instead of the slit 72, a shutter which can be freely opened and closed may be provided. If a shutter which can be freely opened and closed is provided, the transmission of heat and water vapor from the drying unit 14 to the image recording unit 12 can be suppressed even more by closing the shutter at times other than when the photosensitive material A is conveyed therethrough.

Moreover, at the image recording unit 12, a contact-type recording device such as a serial dot printer, or a non-contact type recording device such as an ink jet printer, may be disposed along the conveying path as a back printing device for printing characters on the reverse surface of the photosensitive material A.

Figure 4:
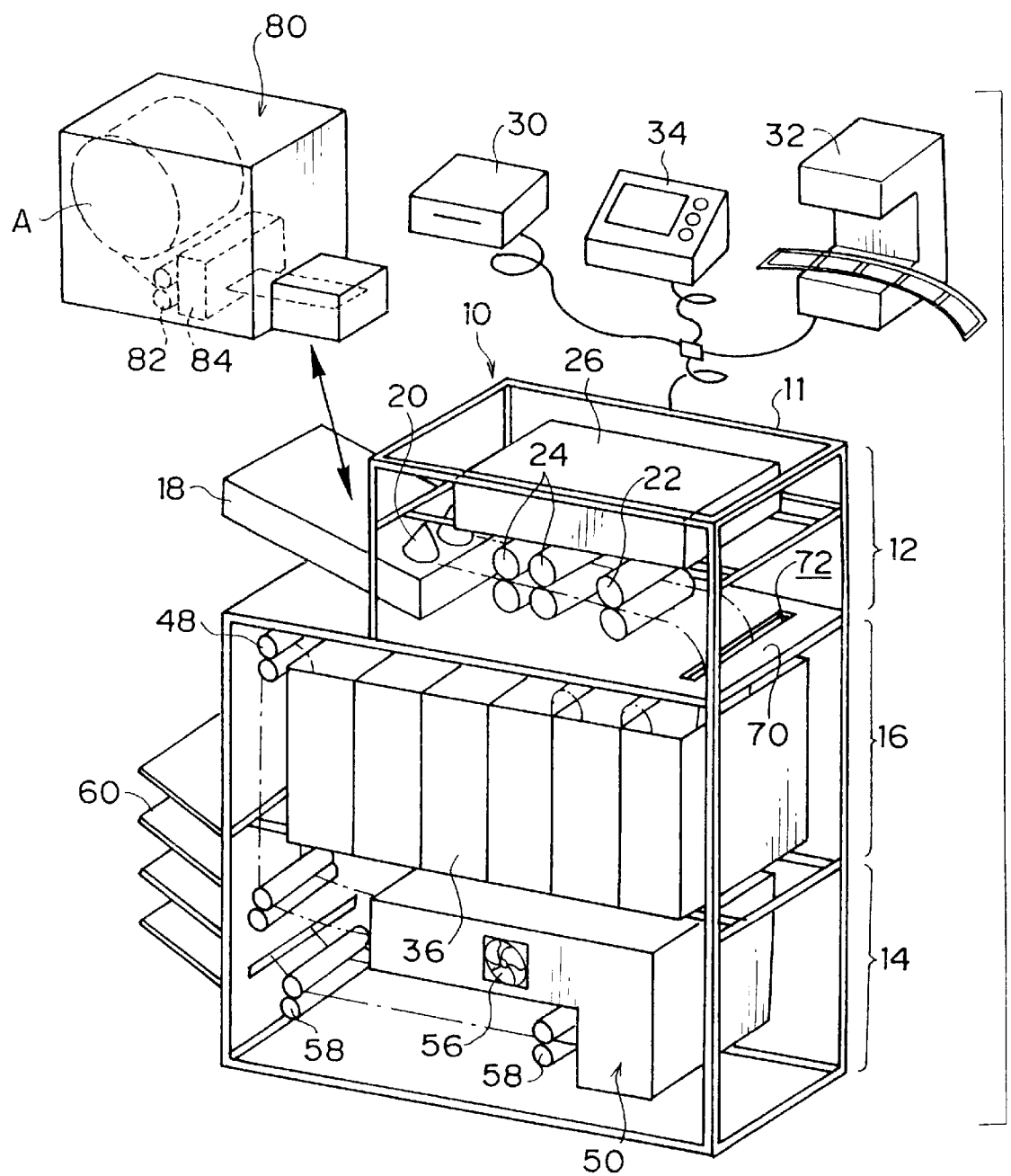
FIG. 4 is a schematic perspective view, for explanation, of an image recording device relating to another example of the first embodiment of the present invention.

In the image recording device 10 relating to the present embodiment, the units 12, 14, 16 are disposed so as to be stacked in that order from the top. However, the order in which the units 12, 14, 16 are disposed is not limited to this order. For example, as shown in FIG. 4, the respective units may be disposed so as to be stacked in the order of the image recording unit 12, the developing unit 16, and the drying unit 14, from the top.

An image recording device relating to a second embodiment of the present invention will be described hereinafter. The arrangement of the image recording unit, the drying unit, and the developing unit relating to the present embodiment are different from the arrangement of the first embodiment. Structural elements which are the same as those of the first embodiment are denoted by the same reference numerals, and detailed description thereof is omitted.

Figure 5:
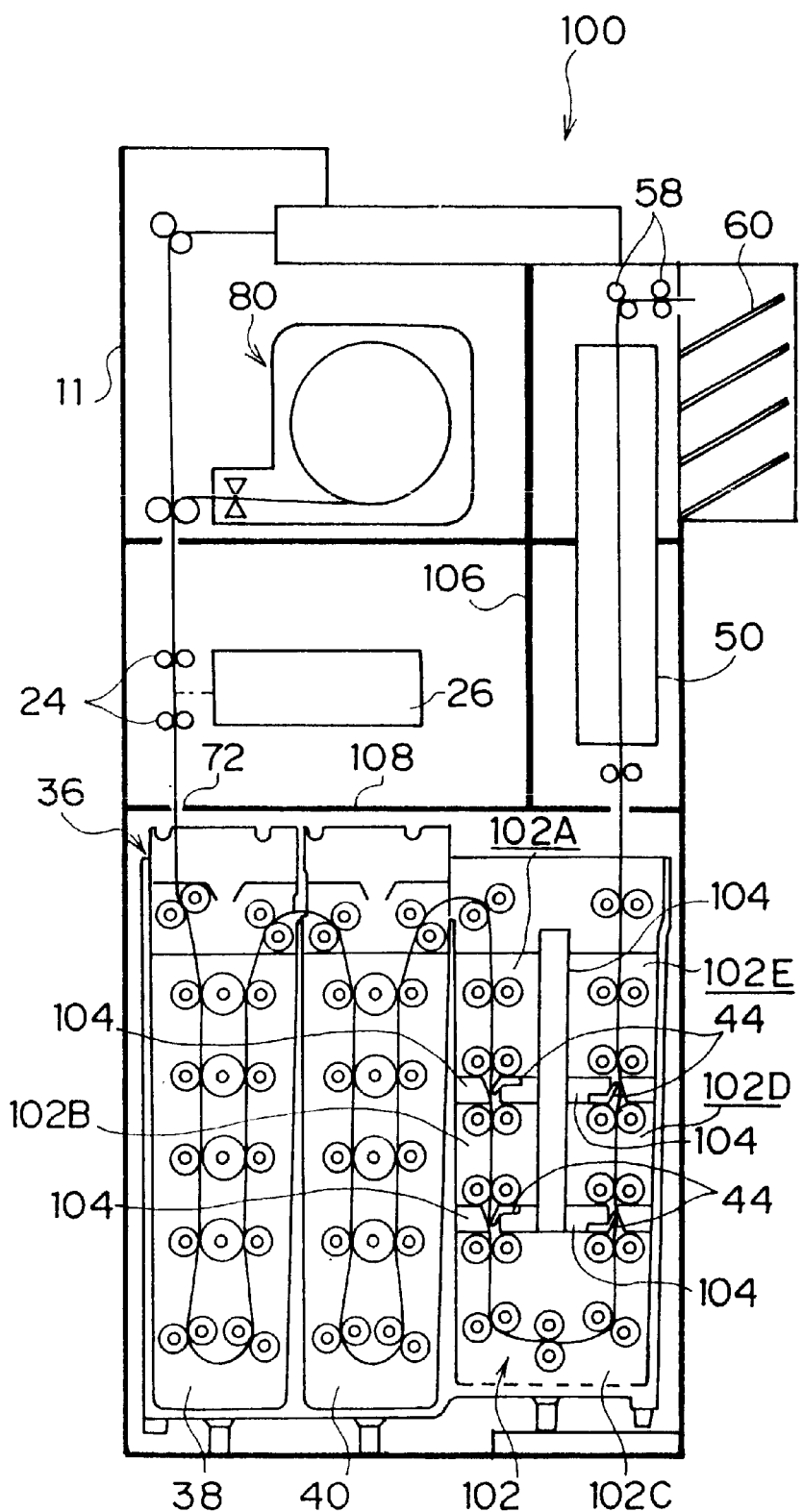
FIG. 5 is a schematic side view of an image recording device relating to a second embodiment of the present invention.

As shown in FIG. 5, in the image recording device 100 relating to the present second embodiment, the photosensitive material magazine 80, which houses the photosensitive material A which is in a roll-form, is disposed at the uppermost level demarcated by the frame 11. The exposure device 26 is disposed at the middle level, and the processor 36 is disposed at the lower level. The drying device 50 is provided above the processor 36 so as to extend in the vertical direction from the middle level to the upper level.

A first wall 108 is provided between the exposure device 26 and the processor 36, and a second wall 106 is provided between the exposure device 26 and the drying device 50. Transmission of heat and water vapor to the exposure device 26 (the image recording process) can thereby be prevented.

Further, at the processor 36, a washing tank 102 is divided by third walls 104 into five small chambers 102A through 102E. The blades 44 serving as sealing members are provided at the third walls 104 at the connecting portions communicating the respective small chambers.

Operation of the image recording device 100 which is structured in this way will now be described.

In the same way as in the first embodiment, the exposure device 26 and the drying device 50 are disposed above the processor 36. Thus, the surface area required for placement of the image recording device 100 is reduced.

The first and second walls 106, 108 are provided between the exposure device 26 and the drying device 50, and between the exposure device 26 and the processor 36, respectively. Thus, vapor and heat from the drying device 50 and the processor 36 can be prevented from being transmitted to the exposure device 26 (the image recording position), and can be prevented from affecting the state of image recording.

Moreover, in the processor 36, the interior of the washing tank 102 is divided into the plural small chambers 102A through 102E by the walls 104. The conveying path of the photosensitive material A is formed by adjacent small chambers being connected to one another at connecting portions having the blades 44. Thus, the conveying path can be made short, and effects which are the same as those achieved by providing a plurality of washing tanks can be attained by providing only one washing tank. As a result, the processor 36 can be made even more compact, and the space for placing the image recording device 100 can be reduced even more.

Next, an image recording device 110 relating to a third embodiment of the present invention will be described hereinafter. Structural elements which are the same as those of the previous embodiments are denoted by the same reference numerals, and detailed description thereof is omitted. The difference between the present embodiment and the previous embodiments is that the image recording device 110 is disposed with a distributing section for distributing the photosensitive materials A from one row into plural rows and a consolidating section for consolidating the photosensitive materials A from plural rows to a single row. Therefore, description will be limited to these sections.

Figure 6:
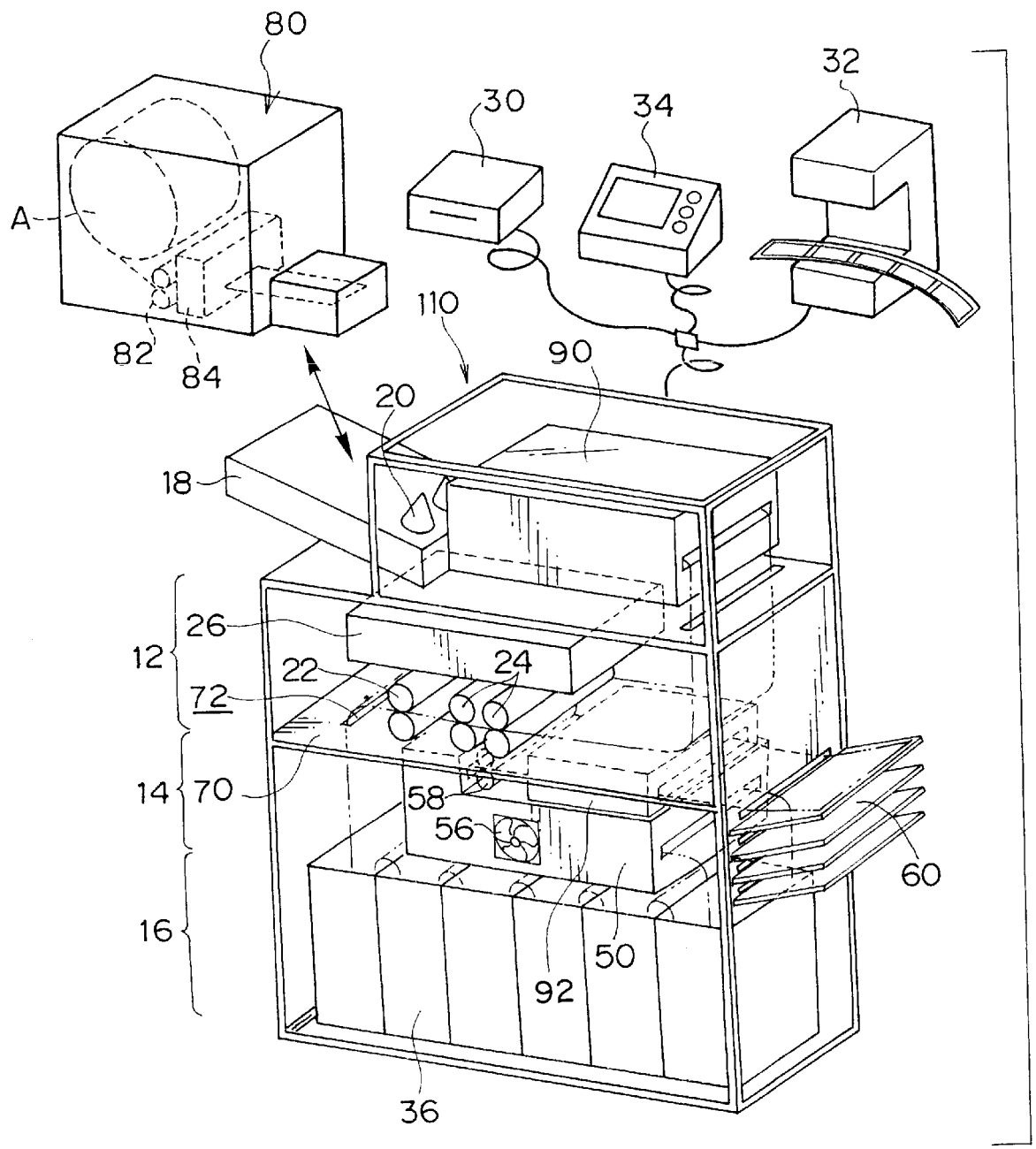
FIG. 6 is a schematic perspective view, for explanation, of an image recording device relating to a third embodiment of the present invention.

As shown in FIG. 6, the image recording device 110 includes a distributing device 90 disposed upstream from the exposure position (exposure device 26) in the conveyance direction on the conveyance path. The distributing device 90 distributes the sheet-shaped photosensitive materials A, which are conveyed in a single row, in a direction orthogonal to the conveyance direction and conveys the photosensitive materials A in plural rows. The mechanism that carries out distribution may be a suction cup, a roller, a manipulator, or the like.

A consolidating device 92 is disposed downstream from the drying device 50 in the conveyance direction on the conveyance path. The consolidating device 92 consolidates the photosensitive materials A that are conveyed in plural rows to a single row by the same mechanism (e.g., a suction cup, a roller, a manipulator, or the like) as the distributing device 90.

Thus, the photosensitive materials A are exposed while being conveyed in plural rows and are passed though the interior of the processor 36. Therefore, the speed at which image recording is conducted is increased.

Figure 7:
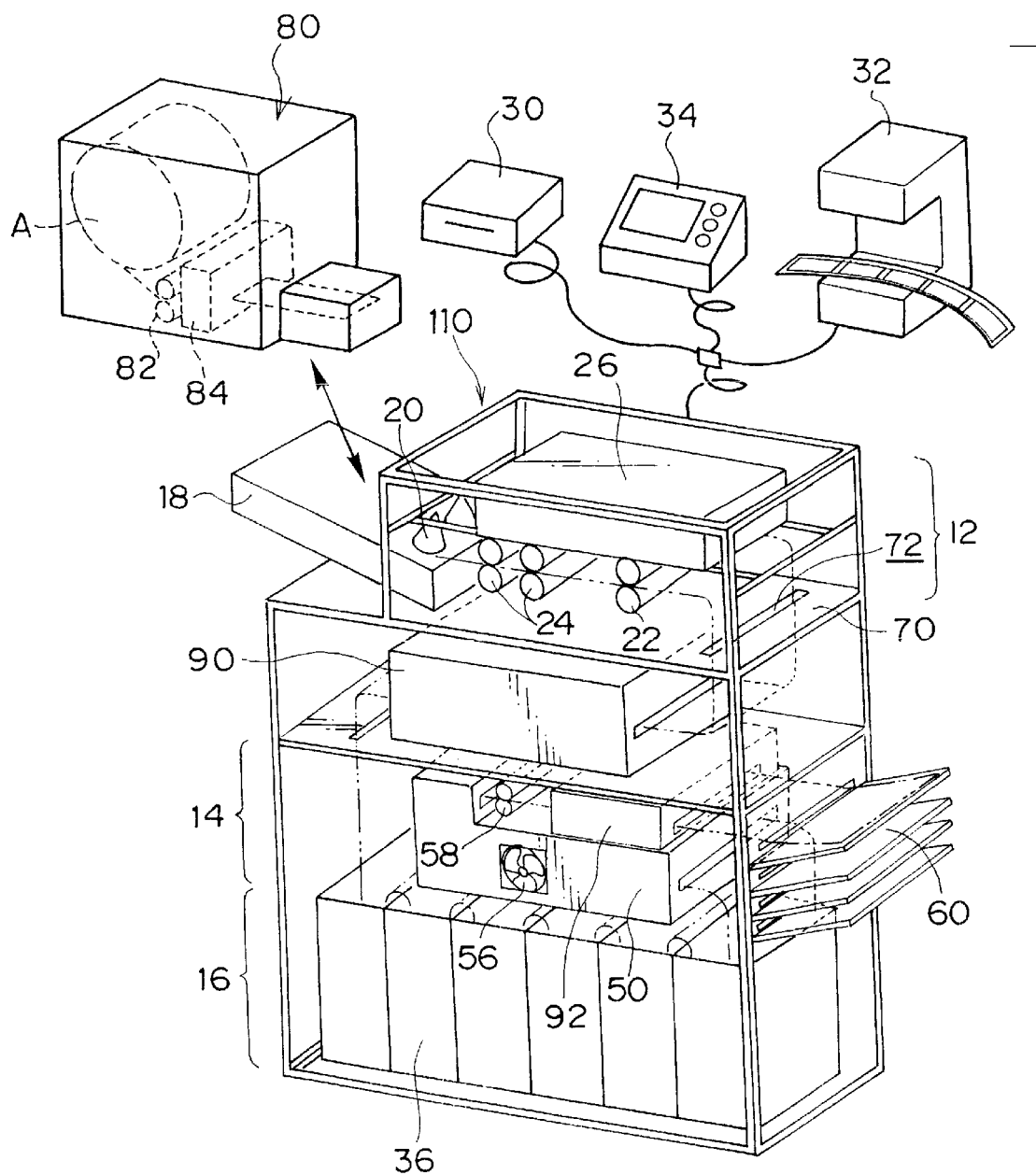
FIG. 7 is a schematic perspective view, for explanation, of an image recording device relating to another example of the third embodiment of the present invention.

Further, as shown in FIG. 7, the distributing device 90 may be disposed downstream from the exposure position (exposure device 26) in the conveyance direction on the conveyance path. In this case, the photosensitive materials A are exposed while being conveyed in a single row, and are distributed and conveyed through the processor 36 in plural rows. Therefore, it is possible to compensate for differences in the speeds at which exposure and development are conducted.

Further, the amount of space occupied by the device 110 can be reduced by disposing the distributing device 90 and consolidating device 92 on or between the stacked image recording unit 12, drying unit 14 and processing unit 16. Therefore, the surface area occupied by the image recording device 110 can be reduced just as with the image recording devices of the previous embodiments.

In accordance with the present invention, the surface area occupied by the image recording device can be reduced.

What is claimed is:

1. An image recording device comprising:
   a supplying section or supplying recording media;
   an image recording section for exposing, on the basis of digital image data, the recording media supplied from the supplying section, so as to record images on the recording media;
   a developing section for developing the recording media on which the images have been recorded;
   a drying section for drying the recording media that have been developed;
   a sealing mechanism provided between the image recording section and one of the developing section and the drying section, for preventing one of heat and vapor from one of the developing section and the drying section from entering the image recording section; and
   a distributing section for distributing the recording media supplied from the supplying section into plural rows in a direction orthogonal to the recording media conveyance direction;
   wherein the distributing section is disposed between the supplying section and the image recording section or between the image recording section and the developing section; and
   wherein the image recording section is disposed above or below the developing section.

2. The image recording device of claim 1, further comprising a consolidating section for consolidating the plural rows of the recording media, downstream from the drying section in the recording media conveyance direction, into a single row.

3. The image recording device of claim 2, wherein a recording medium roll is stocked in the supplying section.

4. The image recording device of claim 2, wherein sheet-shaped recording media are stocked in the supplying section.

5. The image recording device of claim 4, wherein the sealing mechanism has a slit for allowing the recording media to pass therethrough.

6. The image recording device of claim 5, wherein the image recording section has at least one image data input device.

7. The image recording device of claim 6, wherein the developing section has a developing tank, a fixing tank, and a plurality of washing tanks.

8. The image recording device of claim 7, wherein the plurality of washing tanks are interconnected and form a conveyance path for the recording media, and sealing members are provided at portions where the washing tanks are interconnected, with the sealing members being opened only when the recording media pass therethrough and being closed at other times.

9. The image recording device of claim 6, wherein the developing section includes a developing tank, a fixing tank, and a washing tank, with the washing tank being divided into a plurality of small chambers.

10. The image recording device of claim 9, wherein the plurality of small chambers are partitioned by walls and sealing members are provided at the walls at portions where the small chambers are interconnected, with the sealing members being opened only when the recording media pass therethrough and being closed at other times.

11. An image recording device comprising:

a supplying section for stocking and supplying sheet-shaped recording media;

an image recording section for exposing, on the basis of digital image data, the recording media supplied from the supplying section, so as to record images on the recording media;

a developing section for developing the recording media on which the images have been recorded;

a drying section for drying the recording media that have been developed; and a distributing section for distributing the recording media supplied from the supplying section into plural rows in a direction orthogonal to the recording media conveyance direction;

wherein the distributing section is disposed between the supplying section and the image recording section or between the image recording section and the developing section; and wherein the image recording section is disposed above or below the developing section.

12. The image recording device of claim 11, wherein a sealing mechanism is provided between the image recording section and one of the developing section and the drying section, for preventing one of heat and vapor from one of the developing section and the drying section from entering the image recording section.

13. An image recording device comprising:

a supplying section for supplying recording media;

an image recording section for exposing, on the basis of digital image data, the recording media supplied from the supplying section, so as to record images on the recording media;

a developing section for developing the recording media, on which the images have been recorded;

a drying section for drying the recording media that have been developed; and a distributing section for distributing the recording media supplied from the supplying section into plural rows in a direction orthogonal to the recording media conveyance direction, wherein the image recording section is disposed above or below the developing section, and the distributing section is disposed between the supplying section and the image recording section or between the image recording section and the developing section.

14. The image recording device of claim 13, further comprising a consolidating section for consolidating the plural rows of the recording media, downstream from the drying section in the recording media conveyance direction, into a single row.

15. The image recording device of claim 14, wherein sheet-shaped recording media are stocked in the supplying section.

16. The image recording device of claim 15, wherein a recording medium roll is stocked in the supplying section.

* * * * *